United States Patent

Onufer

[15] 3,638,700
[45] Feb. 1, 1972

[54] FASTENER AND METHOD OF FORMING SAME

[72] Inventor: George R. Onufer, Bloomfield Hills, Mich.

[73] Assignee: Russell, Burdsall & Ward Bolt and Nut Co., Port Chester, N.Y.

[22] Filed: Mar. 11, 1969

[21] Appl. No.: 806,119

[52] U.S. Cl. .................................. 151/69, 10/86 R, 85/1 P, 85/32 V, 151/21 C
[51] Int. Cl. ................ F16b 29/00, F16b 37/00, F16b 39/02, F16b 39/22
[58] Field of Search .................... 85/32, 36, 47, 35, 34, 56, 85/1 P; 151/7, 37, 21 C, 21 A, 69; 10/86, 86 F, 86 A

[56] References Cited

UNITED STATES PATENTS

| | | | |
|---|---|---|---|
| 1,337,424 | 4/1920 | Word | 151/21 C |
| 2,299,209 | 10/1942 | Brackett | 85/32 X |
| 3,030,997 | 4/1962 | Collins | 151/7 |
| 3,357,293 | 12/1967 | Holton | 85/35 |
| 3,468,212 | 9/1969 | Tinnerman | 85/32 |

*Primary Examiner*—Ramon S. Britts
*Attorney*—Burton and Parker

[57] ABSTRACT

A nut member having a relatively smooth walled aperture for receiving a male threaded member, and a pair of radially extending spiral lip portions adjacent the opening to the aperture, which receive the threaded portion of the male member and guide it into the aperture, forming a female thread. The male threaded member may have an unthreaded cylindrical end which has a diameter approximately equal to the diameter of the aperture, which is the pitch diameter of the threads, which prevents inadvertant removal of the male member after it is threadably received through the aperture. The male member may then be partially withdrawn, deforming the crest portions adjacent the cylindrical end of the male member, permanently locking the assembly.

The method disclosed herein includes forming the body portion of the unthreaded member including the circular aperture, and forming the spiral lip portions by impacting the end. A mandrel having radial slots may be disposed within the aperture to form the lip portions.

3 Claims, 17 Drawing Figures

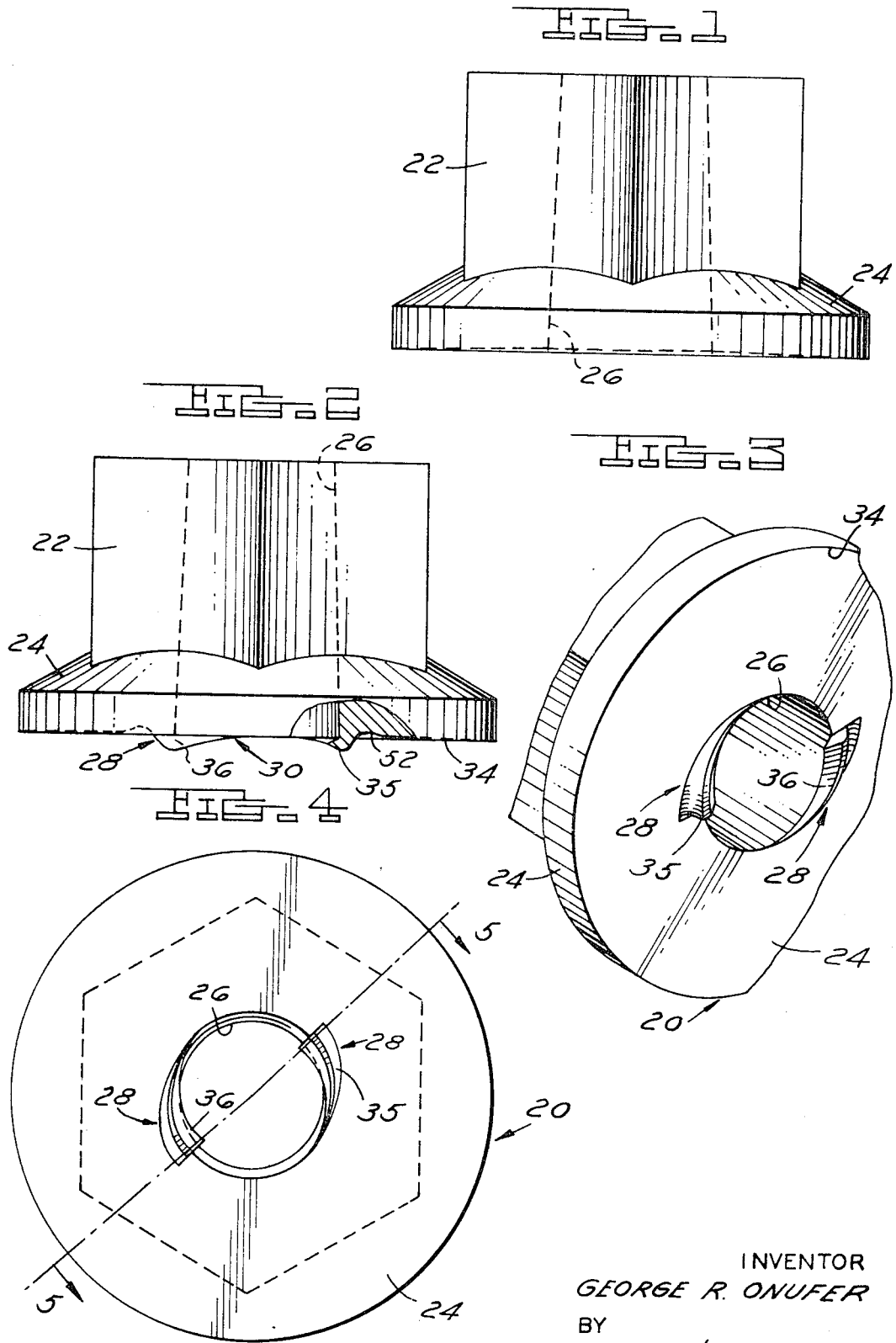

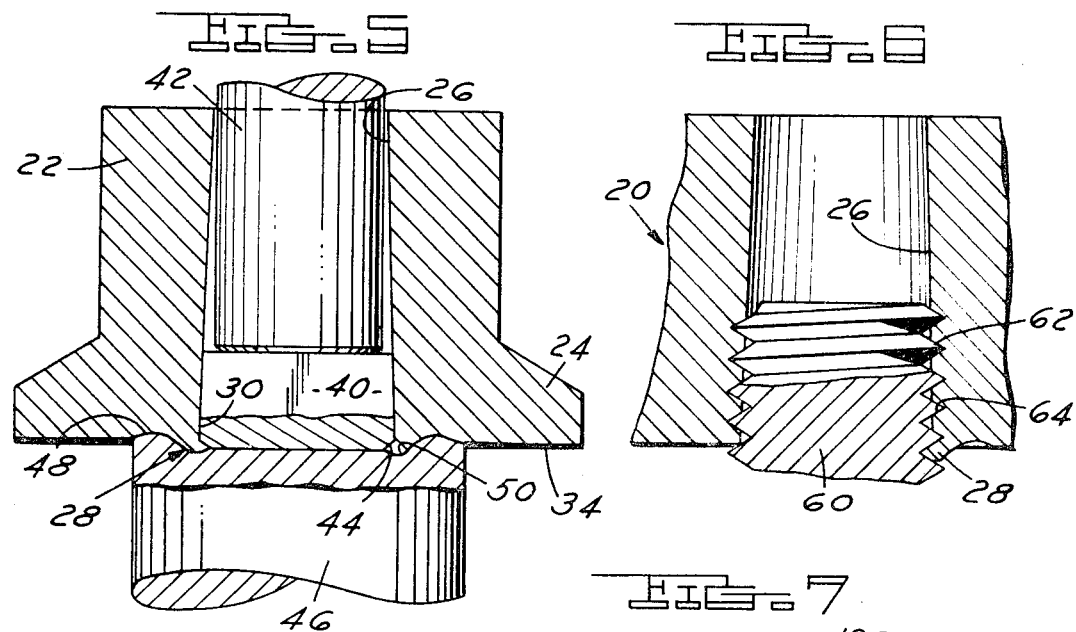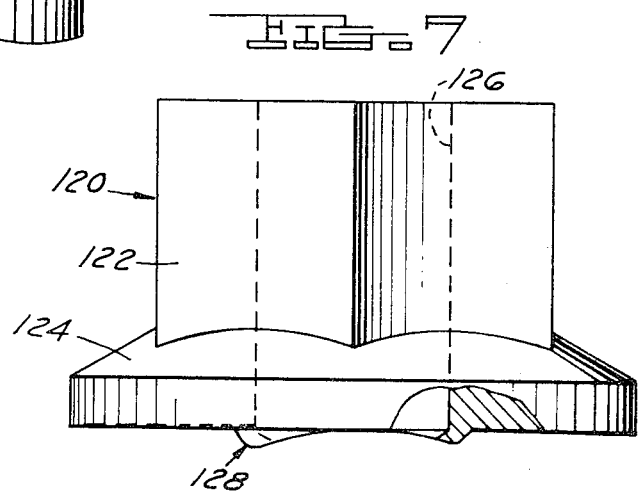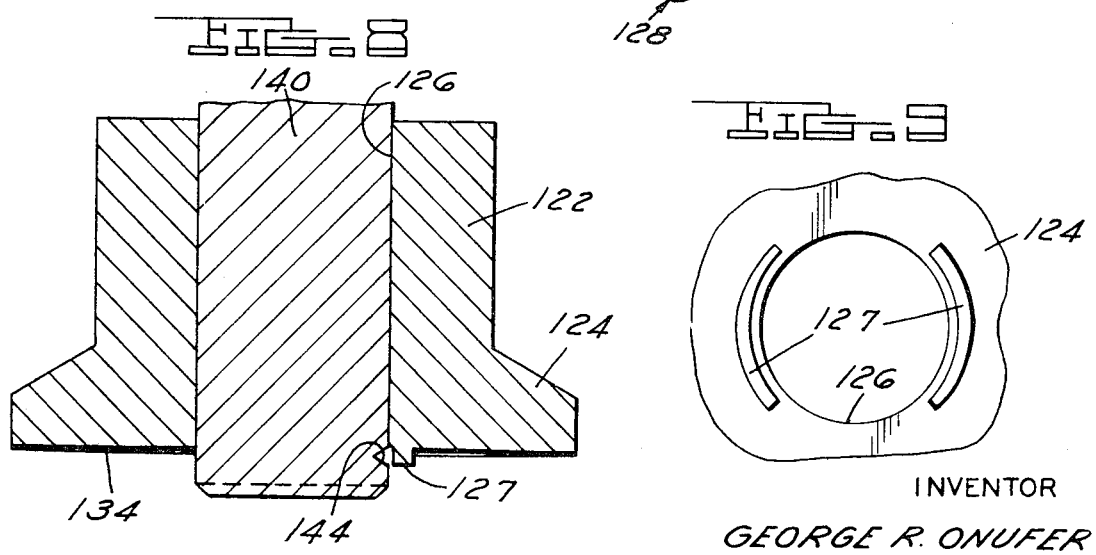
INVENTOR
GEORGE R. ONUFER
BY Burton & Parker
ATTORNEYS

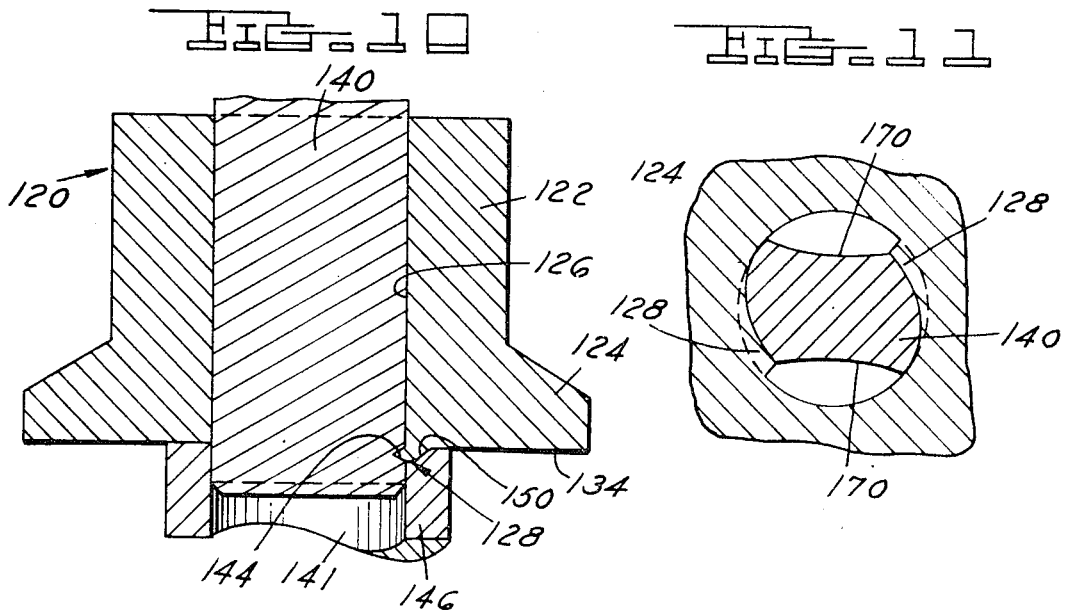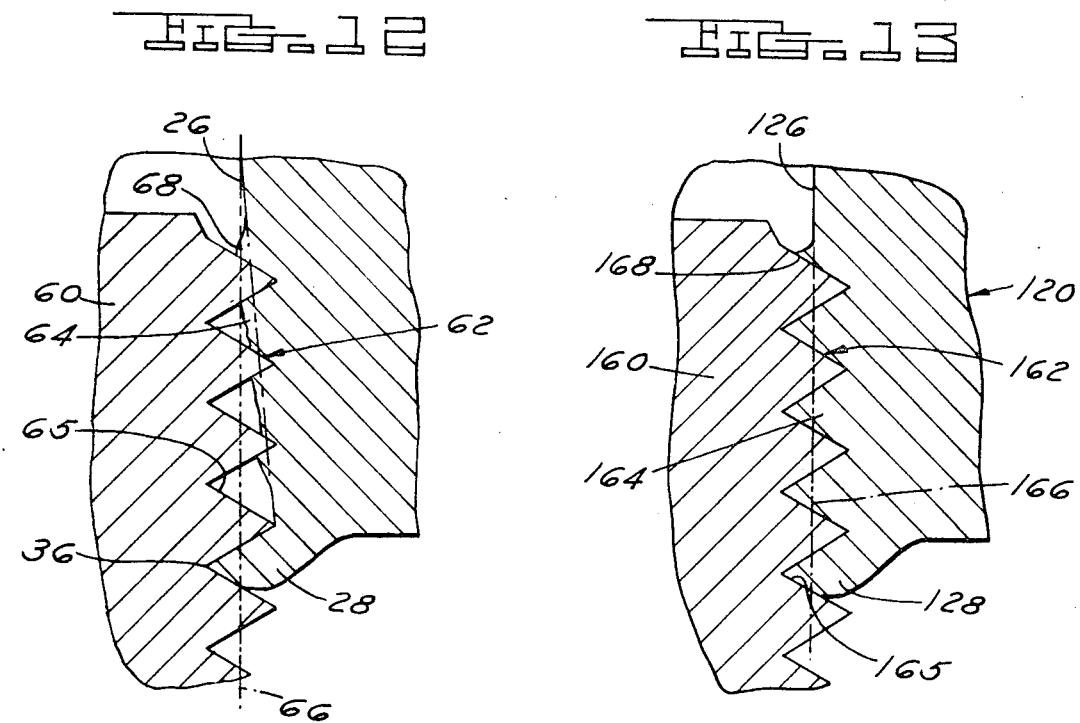

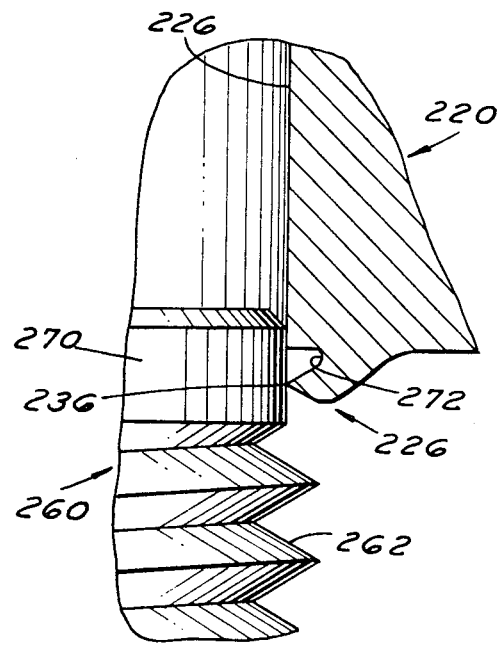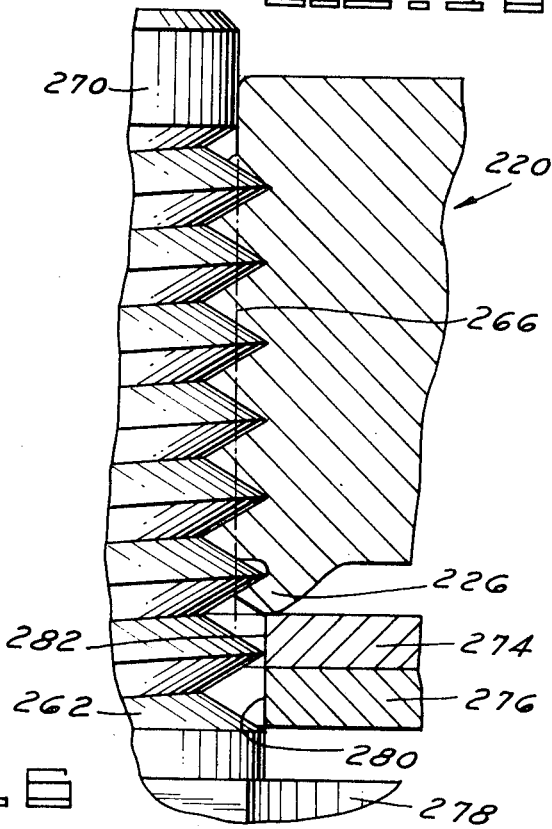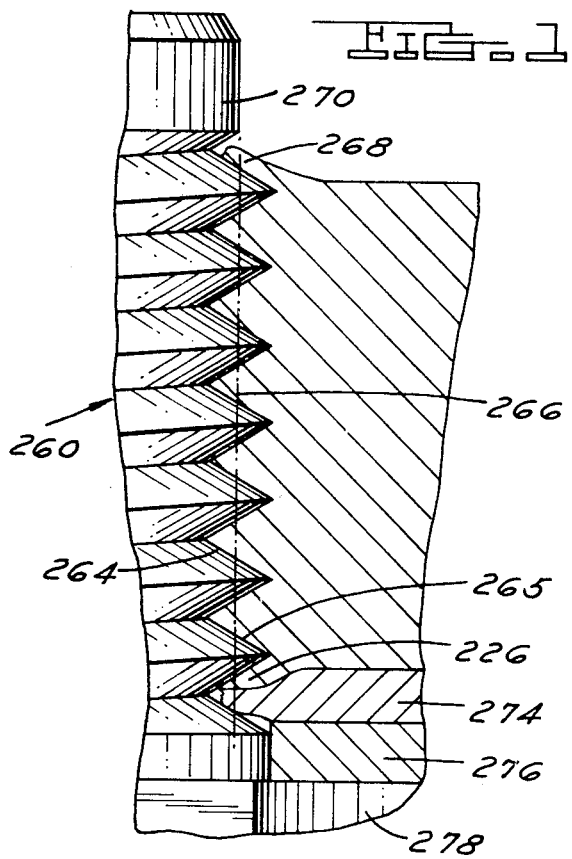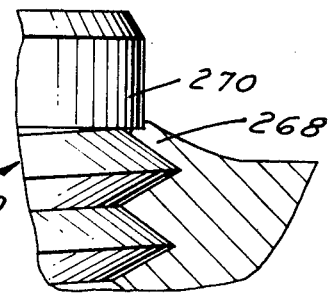

3,638,700

FASTENER AND METHOD OF FORMING SAME

SUMMARY OF THE INVENTION

The fastener and method disclosed herein is adapted to provide a relatively inexpensive nut member wherein the female threads are formed upon receipt of a male threaded bolt or other threaded member. In the preferred embodiment of the invention, the nut member includes radially extending spiral lip portions which guide the male threaded member into the unthreaded aperture in the nut member and provide a "lead screw" action to assist in threading the nut member on the male threaded member. The nut member of this invention may also be self-locking, and the lip portions may be adapted to deform the engaging portion of the structure secured, to provide a substantially integral permanent structure.

The embodiment of the nut member disclosed herein includes an aperture having an open end for receiving a male threaded member, the internal wall defining the aperture being relatively smooth, and a pair of opposed radially inwardly extending spiral lip portions adjacent the open end of the aperture. The spiral lip portions each extend circumferentially about the open end of the apertures less than 180°. The spiral lip portions each have a spiral edge extending spirally toward the open end of the aperture to guide a male threaded member into the aperture. In one of the disclosed embodiments, the internal wall of the aperture is generally conical, having its major diameter adjacent the open end of the aperture. In the other embodiment, the diameter of the aperture is substantially constant, being equal to the pitch diameter of the male threaded member received therein.

The lip portions may include a portion extending beyond the axial end of the nut member which is deformed radially inwardly upon engagement to lock the nut member on the threaded fastener. The axially extending portion may also deform the structural member receiving the nut member and male threaded fastener, adjacent the aperture in the structural member, aiding in the locking action. The spiral lip portion in each of the disclosed embodiments is generally C-shaped, and in one embodiment the spiral edge extends radially inwardly beyond the internal wall of the aperture, such that the internal diameter is less than the internal diameter of the aperture. In this embodiment, the diameter of the spiral edge is approximately equal to the root diameter of the male threaded fastener. In the other embodiment, the spiral edge extends radially inwardly to the internal wall of the opening to permit receipt of an unthreaded member having a diameter substantially equal to the internal diameter of the aperture. The lip portion may include a spiral notch, between the edge and the internal wall of the aperture, receiving the crest of the male threaded member.

The fastener assembly of this invention includes the nut member described hereinabove and a male threaded fastener. The pitch diameter of the male threaded fastener is approximately equal to the internal diameter of the aperture, and may include an unthreaded leading end having a diameter equal to approximately the pitch diameter of the threaded portion, such that the threaded portion cannot be withdrawn through the nut member after the threads are formed in the inner wall of the nut member. In this embodiment, the threaded member forms the threads in the internal wall of the nut member as the threaded portion is received in the spiral lip portions and threaded into the unthreaded portion on the nut. The crest of the female thread thus has a smaller diameter than the unthreaded portion, which is equal to the pitch diameter of the female threads. The nut member cannot therefore be threadably retracted without deforming the crest portion of the female threads.

The method of forming a nut member of this invention includes forming the body portion, including the aperture defined hereinabove. The end of the body member adjacent the opening to the aperture is then deformed to provide a pair of opposed radially extending spiral lip portions as defined hereinabove. The spiral lip portions may be formed by impacting the end of the fastener with a die member having a plurality of annular concave edges which deform the end of the fastener inwardly, causing the lip portions to be deformed axially outwardly and toward the opening of the aperture.

In another embodiment of the method of this invention, a plurality of axially extending lip portions are formed on the nut member during the formation of the body member. The lip portions are defined adjacent the opening to the aperture, but are spaced therefrom. The axially extending annular lip portions are then deformed radially inwardly to provide the spiral edges defined hereinabove. A mandrel may be used to form the spiral lip portions, wherein the mandrel is received within the aperture in the body portion of the nut member, which includes a plurality of radial slots configured to form the spiral lip portions. In this embodiment, the axially extending lip portions are then impacted or otherwise deformed into the radial slots in the mandrel. The mandrel is provided with adjacent grooves extending through the end of the mandrel, permitting rotation of the mandrel to receive the lip portions in the grooves, and removal of the mandrel.

The female threads are formed in the internal wall defining the aperture by receiving a male threaded fastener in the spiral lip portions adjacent the opening to the aperture, and threading the male fastener into the aperture; thereby deforming the internal wall to define an internal thread. In the embodiment of the male fastener having an unthreaded end portion, the threading is continued until the unthreaded portion of the male fastener is received through the aperture, preventing inadvertent withdrawal of the male threaded fastener. Where further locking is desired, the male fastener may then be partially threadably withdrawn, deforming portions of the crest of the female thread to bind such deformed portions "in the threads of the male fastener. The deformed portions permanently"; lock the nut member on the male threaded fastener, providing a substantially integral structure.

Other advantages and meritorious features will more fully appear from the following description, claims, and accompanying drawings, wherein:

BRIEF DESCRIPTION OF THE DRAWINGS

FIG. 1 is a side view of one embodiment of the nut member of this invention, prior to forming the lip portions;

FIG. 2 is a side view, partially cross sectioned, of one embodiment of the nut member of this invention;

FIG. 3 is a schematic perspective end view of the nut member shown in FIG. 2;

FIG. 4 is an end view of the nut member shown in FIG. 2;

FIG. 5 is a side cross-sectional view of the nut member shown in FIG. 2 2, showing the method of forming the nut member;

FIG. 6 is a partial cross-sectional view of the embodiment of the nut member shown in FIG. 2, receiving a male threaded member;

FIG. 7 is a side, partially cross sectioned view of another embodiment of the nut member of this invention;

FIG. 8 is a side cross-sectional view of the nut member shown in FIG. 7, partially formed;

FIG. 9 is an end view of the partially formed nut member shown in FIG. 8;

FIG. 10 is another step in the formation of the nut member shown in FIG. 7;

FIG. 11 is a cross-sectional end view of the embodiment shown in FIG. 10;

FIG. 12 is a partial, cross-sectional view of the embodiment of the nut member shown in FIG. 2, receiving a male threaded member;

FIG. 13 is a partial, cross-sectional view of the embodiment of the nut member shown in FIG. 7 receiving a male threaded member;

FIG. 14 is a partially cross sectioned portion of another embodiment of the nut member, receiving another embodiment of the male threaded fastener;

FIG. 15 is a partially cross sectioned portion of the embodiment shown in FIG. 14, receiving the male threaded fastener;

FIG. 16 is the embodiment shown in FIGS. 14 and 15 showing the full threaded engagement of the male threaded fastener; and FIG. 17 is a partially cross sectioned portion of the embodiment shown in FIGS. 14 to 16, after partial retraction of the male threaded member.

DESCRIPTION OF THE PREFERRED EMBODIMENTS

The embodiment of the nut member 20 shown in FIGS. 2 and 4 includes a body portion 22, which may be hexagonal as shown, a radial flange portion 24, an aperture 26, and a pair of opposed radially extending spiral lip portions 28 adjacent the open end 30 of the aperture. It will be understood, however, that the invention disclosed herein is equally applicable to standard or special nuts, and is not limited to the flange nut shown. In this embodiment, the aperture 26 is generally conical, having its major diameter adjacent the open end 30, as shown in FIG. 2. The wall defining the aperture is preferably "smooth," as distinguished from threaded.

The spiral lip portions 28 may be characterized as generally C-shaped and each include a portion 35 extending below the axial end 34 of the nut member, and a spiral edge 36 extending spirally toward the open end 30 of the aperture, adapted to threadably receive a bolt or the like, as described hereinbelow. The spiral edge 36 of each lip portion extends from below the plane of the end 34 of the nut member to adjacent the open end 30 of the aperture, as shown in FIG. 3, with the leading end of one spiral edge adjacent the following end of the next edge. In the preferred embodiment, the spiral lip portions extend circumferentially less than 180° about the axis of the aperture 26, to receive the threaded member, and in this embodiment the spiral lips extend approximately 90°, as shown in FIGS. 3 and 4. It should also be noted that the edge 36 in this embodiment extends radially inwardly beyond the wall of the aperture 26 to be received in the root portion of the male threaded member.

The method of forming the fastener shown in FIGS. 2 to 4 is disclosed in FIGS. 1 and 5, wherein the body portion including the hexagonal portion 22, the flange portion 24, and the conical aperture 26 may be formed by conventional processes, as shown in FIG. 1. A conical mandrel or die member 40 is then received in the open end 30 of the aperture 26, as shown in FIG. 5, which is supported by a second cylindrical mandrel or piston 42. The end of the mandrel 40 is configured at 44 to receive the lip portions 28. The end 34 of the nut member is then impacted by a die member 46 having raised or convex portions 48 deforming the material axially outwardly and radially inwardly, and a recessed or concave portion 50 receiving the material in the configuration of the spiral lip portions 28, as shown in FIGS. 3 and 4. The resultant nut structure includes concave portions 52 adjacent the lip portions 28, as shown in FIG. 2. The mandrel 42 may then be removed through the upper end, however the mandrel 40 in this embodiment must be rotated 90° to receive the lip portions 28 in slots, not shown, and may then be removed through the open end 30 of the nut, as described more fully in regard to FIG. 11. It will be understood, however, that the mandrel 42 may be made integral with the mandrel 40, or a single mandrel may be utilized.

A male threaded fastener or bolt 60 may then be threadably received in the spiral lip portions 28, and threaded into the unthreaded aperture 26, as shown in FIG. 6. The male fastener 60 is formed of a harder material than the nut member 20, such that the threads 62 of the male member deform the smooth internal wall of the aperture to form female threads 64. The nut member may be formed from various plastics, and the male threaded member may be metal. The nut member may also be formed from a softer metal than the male threaded member; such as SAE 1010 steel, where the male threaded member is formed from SAE 1028 steel.

The utilization of a tapered or conical aperture 26 reduces the torque required to start the male threaded member or bolt in the unthreaded portion of the aperture, as shown in FIG. 12. The spiral lip portion 28 in this embodiment extends radially inwardly beyond the wall of the aperture to be received within the root portion 65 of the male thread 62. The spiral edge 36 of the lip portions 28 guide the male fastener into the aperture 26 and act somewhat as a "lead screw" to assist in threading the nut member on the bolt.

It can be seen from FIG. 12 that the diameter of the conical aperture 26, adjacent the spiral lip portion, is greater than the pitch diameter 66 of the male threaded fastener, and reduces to less than the pitch diameter. The female threads 64, formed in the aperture, are therefore not fully formed adjacent the spiral lip portion, as the material 68 displaced is insufficient. Each female thread formed is however fuller than the last, until a full thread is formed when the diameter of the conical aperture is equal to the pitch diameter of the male threaded fastener. The torque required to thread the bolt in the aperture therefore increases at a predetermined rate, permitting monitoring the progress of the bolt.

The embodiment of the nut member 120 shown in FIG. 7 is similar to the nut member 20 described hereinabove, except that the aperture 126 is cylindrical, and a concave groove is not formed adjacent the lip portion 128. The nut member includes a hexagonal portion 122 and a flange portion 124, as described hereinabove. The method of forming the lip portions is shown in FIGS. 8 to 11.

A pair of rectangular, axially extending flange portions 127 are formed adjacent to, but spaced from the aperture 126 during formation of the body portion of the nut member, as shown in FIG. 9. The rectangular flange portions 127 extend circumferentially about the aperture approximately 90°, as required by the spiral lip portions 128. A generally cylindrical mandrel 140 is then received in the aperture 126, as shown in FIG. 8. The mandrel includes a pair of opposed spiral slots 144 configured to receive and form the spiral lip portions 128. The slots 144 are positioned opposite the flange portions 127, and the end 134 of the nut member is impacted by a die member 146 configured to deform the flange portions into the slots 144 in the mandrel 140. In this embodiment, the die member includes an aperture 141 which receives the end of the mandrel protruding beyond the end 134 of the nut member, and a concave, generally spherical surface 150 which receives the rectangular flange portions, and deforms them radially inwardly, into the spiral slots 144, as shown in FIG. 10. The mandrel 140 includes a pair of grooves 170, adjacent the slots 144, which extend through the end of the mandrel as shown in FIG. 11. After forming of the radial lip portions, the mandrel 140 is removed by rotating the mandrel 90 degrees, which disposes the lip portions in the grooves 170. The mandrel may then be removed through the top of the aperture 126.

FIG. 13 illustrates the configuration of the female threads 164, formed by threading a male threaded fastener or bolt 160 into the unthreaded aperture 126 in this embodiment. The diameter of the cylindrical aperture 126 is approximately equal to the pitch diameter 166 of the bolt. It will be understood however that a slight clearance will normally be provided in metal-to-metal applications, such as 0.003 inch. The first female thread 165, in this embodiment, will be substantially fully formed because the area radially inwardly of the pitch diameter is equal to the area radially outwardly of the pitch diameter. The other features of the assembly may be similar to the embodiment shown in FIG. 12, and has been numbered accordingly.

FIGS. 14 to 17 illustrate another embodiment of the fastener assembly of this invention, wherein the male threaded fastener 260 includes an unthreaded, generally cylindrical work entering end portion 270, followed by a conventional threaded portion 262. The nut member 220 in this embodiment includes a relatively smooth-walled cylindrical aperture 226, and a modified spiral lip portion 228. The remainder of the nut member may be identical to the nut members disclosed hereinabove.

The spiral edge 236 of the lip portion in this embodiment extends radially inwardly only to the wall of the aperture, such that the internal diameter of the spiral edge is substantially equal to the pitch diameter 266 of the male threaded member, as shown in FIGS. 15 and 16. The lip portions also include a radially extending spiral groove 272, located between the spiral edge 236 and the internal wall of the aperture 226, which receives the crest of the male threaded fastener. The diameter of the unthreaded portion 270 of the male threaded member is also approximately equal to the pitch diameter 266, such that the end may be received in the unthreaded portion of the aperture, as shown in FIG. 14. The threaded portion 262 of the male member is then received in the spiral lip portions 226, and then threaded into the aperture 266, as described above and shown in FIG. 15.

The fastener assembly shown in FIG. 15 is utilized to secure a pair of platelike members 274 and 276, and the male threaded fastener includes a conventional head portion 278. The male fastener is received through apertures 280 and 282 in the platelike members, such that the nut member 220 is disposed against one side of the plate 274, and the head portion 278 of the male member is disposed against the opposite side of the platelike member 276. It will be understood that the platelike members have been shown only to illustrate the cooperation between the fastener elements of this invention, and the invention disclosed herein is suitable to secure various structural element and is not limited to the plates, or platelike members shown.

The threading of the male fastener into the cylindrical apertures 226 is continued until the nut member firmly engages the adjacent plate member 274, at which time the unthreaded portion 270 of the male threaded member is disposed through the nut member, as shown in FIG. 16. The female threads 264 are substantially fully formed adjacent the lip portion 226, as described hereinabove, because of the diameter of the aperture is substantially equal to the pitch diameter 266 of the male threaded fastener. The lip portion 226 will be deformed radially inwardly, into the root 265 of the male threads upon engagement with the platelike member 274, as shown in FIG. 16. Further, the platelike member 274 may also be deformed, as shown, where the member is formed of a softer material than the male threaded fastener 260. The deformation of the lip portion 226 and the plate member 274, into the root of the male threads, securely locks the fastener assembly and provides a substantially integral structure. Further, the unthreaded portion 270 of the male threaded fastener cannot be retracted through the aperture because the diameter of the unthreaded portion is greater than the diameter of the internal threads of the nut member at the crest portion. It will be understood that the locking action of the unthreaded portion 270 of the male threaded fastener may be utilized independently of the locking action provided by the deformed lip portion 226, and vice versa, however the combination provides an extremely secure assembly.

Where further locking is desired, the male fastener 260 may be partially threadably retracted, as shown in FIG. 17. In this embodiment, the unthreaded portion 270 of the male fastener engages the material 268 extruded from the aperture 226 during formation of the female threads, securely locking the nut member and the male fastener. Further threading of the male fastener, will deform a portion of the crest of the female threads, locking the assembly. The number of turns required to lock the assembly will depend upon the relative hardness of the nut member and the male threaded fastener, and the particular application. It will also be understood that the invention disclosed herein is not limited to the utilization of a cylindrical aperture in the nut member, or a cylindrical male threaded fastener. A lobular threaded fastener, or a nut member having a lobular aperture may be utilized to reduce the torque required to form the threads in the aperture and improve the locking action.

What is claimed is:

1. A fastener assembly comprising a nut member and a relatively harder male threaded member, said nut member having an unthreaded generally circular aperture having an open end adapted to receive said male threaded member and having an internal diameter approximately equal to the pitch diameter of said male threaded member, and a pair of opposed radially extending spiral lip portions adjacent said open end of said aperture each extending spirally toward said open end to guide the male threaded member into the circular aperture said spiral lip portions having a spacing therebetween at least as great as the internal diameter of said aperture, and said male threaded member having an unthreaded leading end of a diameter equal to approximately the pitch diameter of the threaded portion and slightly less than the internal diameter of said unthreaded aperture, such that the unthreaded portion cannot be withdrawn through the nut member after threads are formed in the aperture of the nut member by threading the male member thereinto through said open end.

2. The fastener assembly defined in claim 1, characterized in that said spiral lip portions each extend circumferentially approximately 90° relative to the axis of said aperture with the leading edge of one spiral lip portion adjacent the following edge of the other lip portion.

3. The fastener assembly defined in claim 2, characterized in that the spiral lip portions are generally C-shaped and extend beyond the axial end of the nut member to be deformed radially inwardly upon engagement to lock the nut member on the male threaded fastener.

* * * * *